May 16, 1944.　　　G. POTSTADA　　　2,349,110
GROUND STAKE
Filed Oct. 15, 1940　　　2 Sheets-Sheet 2

INVENTOR
*George Potstada*
BY
*Joseph B. Gardner*
ATTORNEY

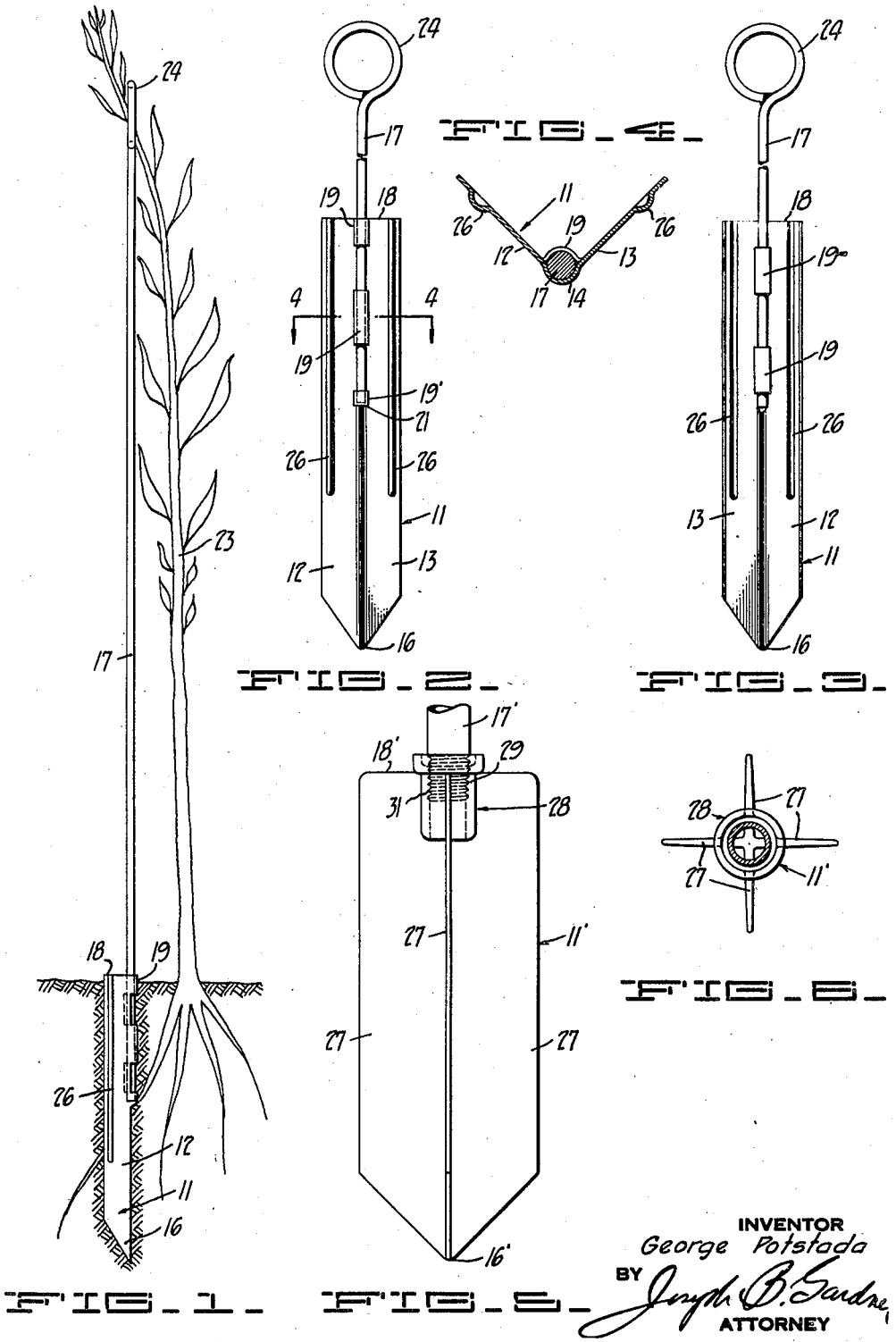

Patented May 16, 1944

2,349,110

UNITED STATES PATENT OFFICE 2,349,110

GROUND STAKE

George Potstada, Oakland, Calif.

Application October 15, 1940, Serial No. 361,225

2 Claims. (Cl. 189—28)

The invention relates to devices adapted for insertion into the ground or the like for general anchorage purposes such as for supporting various types of uprights, e. g. fence posts, poles, plant supporting members, guy wires, etc.

An object of the invention is to provide a relatively inexpensive ground stake of the character described which may be readily inserted into the ground, as by driving the same longitudinally into the earth or by casting the same in concrete or the like and which will provide for the support of a wide variety of devices which are to be anchored in place in the ground.

Another object of the invention is to provide a ground stake of the character described which is particularly adapted for the support of a flower or plant or the like and will provide an upright support for plant stalks which while solidly anchored in the ground, will permit a limited and desirable lateral yieldability and swaying of the upright.

Still another object of the invention is to provide a general utility ground stake of heavier design which may be used for supporting fence posts, umbrella poles, flag poles, camping tent equipment, washing lines, etc.

A further object of the invention is to provide a ground stake of the character described which in all embodiments thereof will be relatively inexpensive in manufacture and will provide an exceedingly sturdy support in the ground which becomes increasingly compacted in the ground with time and use, and be of a design permitting of ready and easy insertion into the ground.

The invention possesses other objects and features of advantage, some of which, with the foregoing, will be set forth in the following description of the preferred form of the invention which is illustrated in the drawings accompanying and forming part of the specification. It is to be understood, however, that variations in the showing made by the said drawings and description may be adopted within the scope of the invention as set forth in the claims.

Referring to said drawings:

Figure 1 is a side elevation of a ground stake constructed in accordance with the present invention shown operatively mounted in the ground for supporting a plant.

Figure 2 is a front elevation of the ground stake illustrated in Figure 1.

Figure 3 is a rear elevation of the ground stake illustrated in Figures 1 and 2.

Figure 4 is a cross sectional view of the ground stake taken substantially on the plane of line 4—4 of Figure 2.

Figure 5 is a side elevation of a modified form of the ground stake.

Figure 6 is a plan sectional view of the ground stake illustrated in Figure 5.

Figure 7:
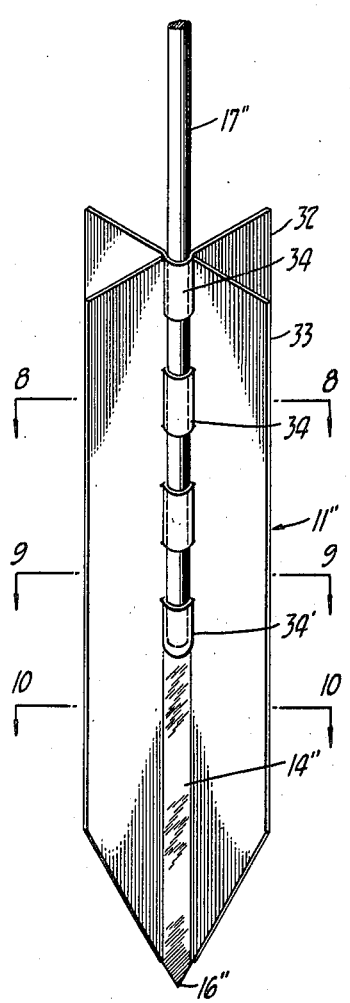
Figure 7 is a perspective view of another modified form of the invention.
Figure 8:
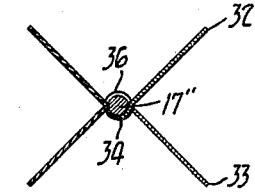
Figure 8 is a cross sectional view of the form of the invention illustrated in Figure 7 and is taken substantially on the plane of line 8—8 of Figure 7.
Figure 9:
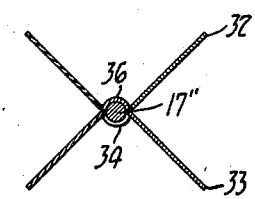
Figure 9 is a cross sectional view taken substantially on the plane of line 9—9 of Figure 7.

The ground stake of the present invention consists briefly of an elongated metal member which is adapted for longitudinal insertion into the ground and which is provided with a plurality of outwardly or radially extending flange portions which engage in the earth outwardly from the longitudinal center of the member to anchor the same against rotation, and an upright attaching and supporting means which is positioned substantially centrally of the upper end of the member.

In the form of the invention as depicted in Figures 1 to 4, the ground stake comprises an elongated metal member 11 which, as seen in Figure 4, is of substantially V-shape in cross section to provide substantially right angularly related sides 12 and 13 which extend outwardly from the central portion 14 of the member and longitudinally for the full length of the member. The member 11 is pointed at one end 16 thereof by beveling the sides 12 and 13 towards such end to facilitate the longitudinal insertion of the member into the ground with the point 16 lowermost, as illustrated in Figure 1. When the member is so inserted into the ground it will be clear that the outwardly or radially extending portions 12 and 13 are securely anchored in the ground to prevent any rotation of the member in the ground and also by reason of the relatively large area of contact of the member with the ground, the member is firmly held in the ground. Also by reason of the angular relation of the sides, any twisting or other movement of the member in the ground will cause a compacting of earth against the flange sides. While the side portions 12 and 13 may be angularly related otherwise than at substantially right angles as here shown, I have found that the right angular relationship between these sides greatly facilitates the longitudinal insertion into the ground.

In the form of the invention illustrated in Figures 1 to 4, an upright member is associated with the ground stake, such member here being in the form of a relatively long and relatively flexible metal rod 17 which is fastened to the member 11 adjacent the upper end 18 thereof. Preferably the rod 17 is secured to the central portion 14 of the member and is substantially longitudinally aligned with such portion whereby the side portions 12 and 13 extend substantially radially from the rod. Means for attaching the rod 17 to the member here consists of a plurality of longitudinally spaced embossed ferrules 19 which are alternately pressed out on the front and rear sides of the member so as to define diametrically opposed portions for embracing opposite sides of the rod to hold the latter centrally and longitudinally on the member. Preferably, the innermost positioned ferrule 19' is formed with a solid base portion 21 which serves as a seat for the inner end 22 of the rod to limit the longitudinal insertion of the rod in the ferrules.

As illustrated in Figure 1, this form of the ground stake is particularly adapted for supporting the stalk 23 of a plant or the like and preferably the ground stake is inserted into the earth adjacent to the plant so that the rod 17 extends upwardly adjacent and substantially parallel to the plant stalk 23 so that the latter may be tied to the rod 17 to hold the plant in properly supported position. Also I prefer to form the rod in such manner that the same will permit attachment of the plant thereto without auxiliary tie means. To effect this purpose the rod may be of various forms and as here shown, the upper end of the rod is formed with a closed loop 24 through which the plant may be mounted for supporting the upper portion of the plant. The loop also may be used for tying of string or cord or the like to the rod and the plant, and in addition the closed form of the loop removes any sharp top portions on the rod which might cause injury to the user while bending over the same, as for example, when tying or adjusting a plant to the rod. As aforementioned the rod 17 is relatively flexible so that the same may be permitted to bend and sway when supporting a plant in a relatively strong wind, while its base support is rigid. Preferably also in order to reenforce the member 11 and to assist in the insertion thereof into the ground, the side portions 12 and 13 are each formed with a longitudinal rib 26 which in the present case extends from the upper end 18 of the member to adjacent the lower end thereof.

The ground stake may be fabricated and assembled in various ways and preferably the rod 17 is attached to the member 11 during the forming operation of the latter so as to firmly clamp and hold the rod in the afore-mentioned ferrules. Preferably, the first step in the manufacture of the device is to blank out the member 11 in flat form with the ferrules embossed thereon and the grooves impressed. Thereafter the rod may be inserted into the ferrules and the flat blank then bent into the V-shape form as shown in Figure 4, thereby securely clamping the rod in place. In this manner no soldering or welding of the parts is necessary to secure an attachment and each part may be galvanized separately and attached without breaking of the protective galvanized surface on the members. On the other hand, as will be clear, an attempt to weld the members together would require galvanizing of the completed unit after welding if such a protective coating was to be used.

In the form of the invention as illustrated in Figures 1 to 4 of the drawings, the ground stake may be easily and readily inserted into the earth by holding the upper end of the rod to locate the pointed end 16 of the stake at the place of insertion and then stepping upon the top edges of the flanges 12 and 13.

A modified form of the invention has been illustrated in Figures 5 and 6 which is particularly adapted for relatively heavy duty use and as a general utility ground stake. As here shown, the stake member 11' is preferably cast from iron or other metal so as to provide a unitary elongated metal member having a plurality of radially extending fins or flanges 27. The member is pointed at the lower end 16' thereof to facilitate insertion into the ground by beveling the flanges 27 towards such end in the same manner as in the preferred form of the invention. Positioned centrally of the opposite upper end 18' of the member is an upright receiving means 28 which as here shown, consists of an open top threaded socket 29, adapted for the receipt of a threaded end 31 of an upright 17', here in the form of a tube or pipe. Preferably the pipe receiving means 28 and the member 11' together with the fins 27 are all formed as an integral part of a single casting. However, as will be understood, the member may be made from metal plates cut and attached to provide the radial flanges 27 and the means 28 may in such case consist of an internally threaded tube or sleeve welded or otherwise secured centrally to the upper end of the plates. In this form of the invention as in the form illustrated in Figures 1 to 4, the flanges extend radially from the upright receiving means whereby the top edges of the flanges are exposed for applying a downward pressure on the device for insertion into the ground.

Figure 10:
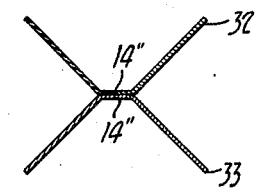
Figure 10 is a cross sectional view taken substantially on the plane of line 10—10 of Figure 7.

A further modified form of the invention is illustrated in Figures 7 to 10 wherein the ground engaging part 11" of the member is composed of a pair of substantially V-shaped members 32 and 33 similar in form and construction to the member 11 of the first described embodiment. The members 32 and 33 are formed with a plurality of longitudinally spaced embossed ferrules 34 and 36 which are so spaced longitudinally from each other as to interfit as shown in Figure 7, to provide a longitudinal opening for the receipt of a vertical rod 17". As will be seen from Figures 7 and 8, the ferrule of one of the members 32 and 33 is extended through the slot formed in the opposite member so as to encompass a side of the rod normally opposite to the member. In this manner the ferrules of the members 32 and 33 embrace diametrically opposite sides of the rod 17" and thus securely lock the members on the rod. Also as will be seen from Figures 8 and 9, the members 32 and 33 abut each other adjacent the periphery of the rod, spaced from the rod axis, and thereby are held against relative rotation of the rod. The central portions 14" of the members below the ferrules are flattened as shown in Figure 10, so that the members lie directly against each other adjacent the lower end 16" of the stake. This end is preferably pointed as in the previous embodiments by beveling the flange sides of the members 32 and 33 towards the end 16". Also in this form of the invention in common with the preceding forms, the substantially radially extending fins or flanges are disposed at substantially right angles to each other so as to facilitate insertion of the stake into the ground. The lowermost ferrules 34' of the members are preferably of closed bottom construction so as to provide a seat for the lower end of the rod in a manner similar to that in connection with the first embodiment.

I claim:
1. A ground stake comprising, an elongated strip of sheet metal formed to be completely em- bedded in the ground and being bent about the longitudinal center portion thereof to provide substantially right angularly related side portions intersecting said center portion, a plurality of longitudinally spaced ferrules extending from the upper end to substantially the middle of the strip and stamped out of said center portion for receipt of a rod, the lower of said ferrules having a closed end to seat the end of said rod, and the upper of said ferrules having its opposite ends open to permit the rod to extend completely through the ferrule, and the alternate ferrules being formed by depressing said center portion in opposite directions.

2. A ground stake comprising an elongated strip of sheet metal formed to be completely embedded in the ground and being bent about the longitudinal center portion thereof to provide substantially right angularly related side portions intersecting said center portion, a plurality of longitudinally spaced ferrules extending from the upper end to substantially the middle of the strip and stamped out of said center portion for receipt of a rod, the lower of said ferrules having a closed end to seat the end of said rod, and the upper of said ferrules having its opposite ends open to permit the rod to extend completely through the ferrule, and the alternate ferrules being formed by depressing said center portion in opposite directions, and longitudinally extending corrugations formed in said strip adjacent the outer edges thereof and extending downwardly from the upper end of the strip to between the lower ferrule and the lower end of the strip.

GEORGE POTSTADA.